UNITED STATES PATENT OFFICE.

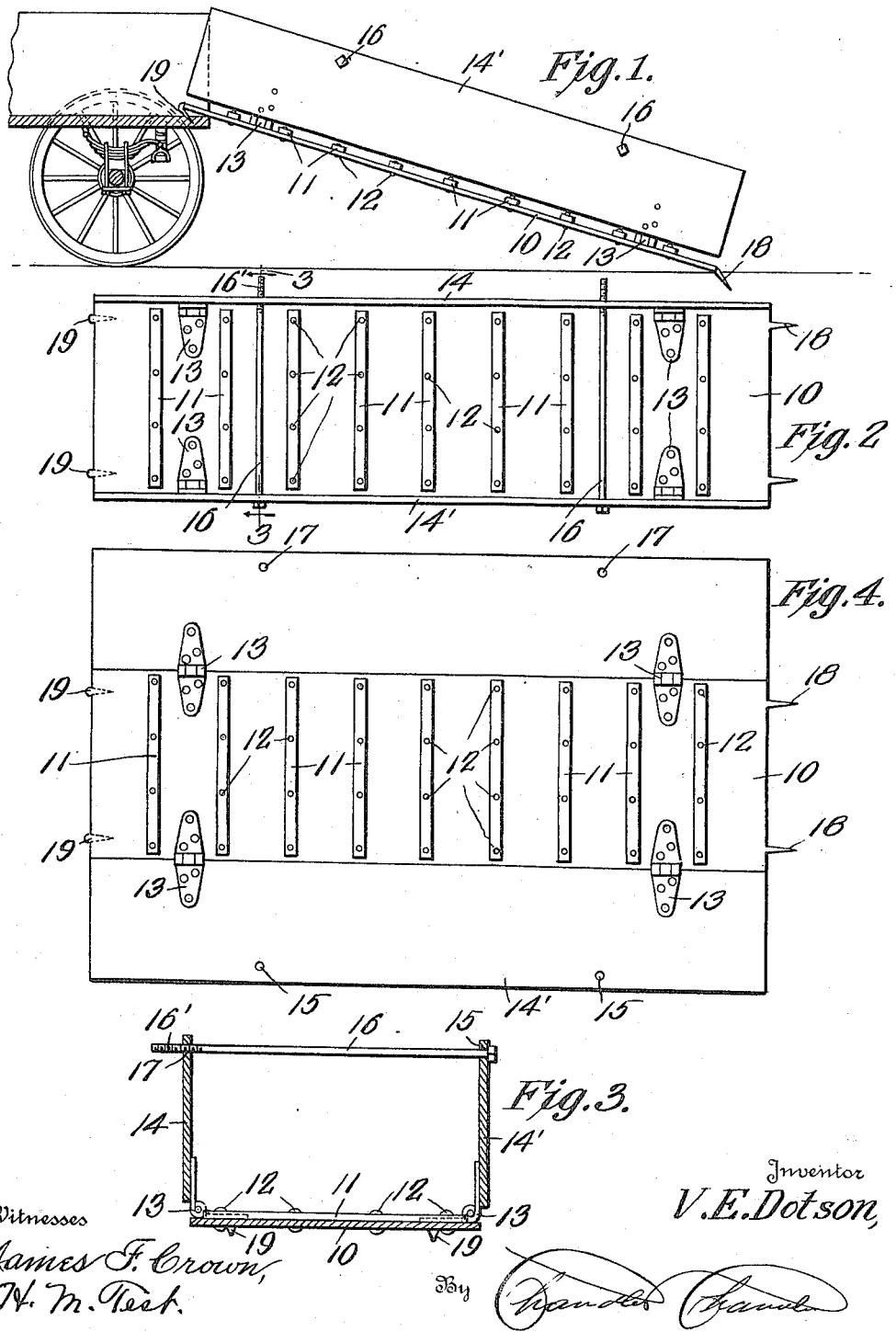

VIOLA E. DOTSON, OF LENOX, IOWA.

LOADING AND UNLOADING CHUTE.

1,221,156. Specification of Letters Patent. Patented Apr. 3, 1917.

Application filed February 28, 1916. Serial No. 81,029.

*To all whom it may concern:*

Be it known that I, VIOLA E. DOTSON, a citizen of the United States, residing at Lenox, in the county of Taylor, State of Iowa, have invented certain new and useful Improvements in Loading and Unloading Chutes; and I do hereby declare the following to be a full, clear, and exact description of the invention, such as will enable others skilled in the art to which it appertains to make and use the same.

This invention relates to improvements in loading and unloading chutes, and particularly to chutes for loading and unloading cattle.

One object of the present invention is to provide a chute which can be quickly and easily collapsed for storing or for placing away when not in use so that it will occupy a very small space.

Another object is to provide a chute which can be conveniently set up and held firmly in engagement with the ground and with a wagon for facilitating the loading and unloading of cattle.

Other objects and advantages will be apparent from the following description when taken in connection with the accompanying drawing.

In the drawing:

Figure 1 is a side elevation of my improved chute showing the same in operative position;

Fig. 2 is a top plan view of the same;

Fig. 3 is a transverse section on the line 3—3 of Fig. 2;

Fig. 4 is a plan view of the chute in collapsed position.

Referring particularly to the accompanying drawing, 10 represents the bottom of the chute which is preferably formed of sheet metal. Extending transversely on the upper face of the base and arranged in parallel relation are a series of strips 11, secured to the base by means of the rivets 12. These strips prevent the animals slipping when ascending or descending the chute. Connected to the opposite longitudinal edges of the base, by means of the hinges 13, are the side walls 14 and 14', in the upper edge of the latter of which there are formed openings 15 for receiving the rods 16 therethrough. Corresponding portions of the walls 14 are formed with threaded openings 17 for the reception of the threaded ends 16' of the rods 16. These rods, when properly placed hold the walls 14 and 14' in proper vertical spaced position, and are of such a height that the animals can easily pass thereunder. At one end of the base are a plurality of prongs 18 which are adapted to be driven into the ground to prevent the chute from slipping, while prongs 19 are carried by the other end of the base and adapted to be driven into the end of the wagon bed to hold the chute in an inclined position and thus facilitate the passage of the animals to and from the wagon.

The device is preferably made of metal but may be made of wood or other suitable substance, as desired, provided that the material is of sufficient strength to support the animal.

By removing the bars which hold the sides up, the sides can be folded down onto the base whereby a very small space will be occupied by the device when not in use.

What is claimed is:

1. A stock chute comprising a bottom member, side members hinged to the sides of the bottom member, said side members being movable outwardly to lie in the plane of the bottom with their edges abutting and movable inwardly to fold on said bottom, and means to hold the side members vertical.

2. A stock chute comprising a bottom member, side members hinged to the sides of the bottom member, said side members being movable outwardly to lie in the plane of the bottom with their edges abutting and movable inwardly to fold on said bottom, means to hold the side members vertical, and prongs projecting downward from one end of the bottom member to form support engaging means.

In testimony whereof, I affix my signature, in the presence of two witnesses.

VIOLA E. DOTSON.

Witnesses:
W. RAY GEORGE,
J. A. GEORGE.

Copies of this patent may be obtained for five cents each, by addressing the "Commissioner of Patents, Washington, D. C."